US010519388B2

(12) United States Patent
Zink et al.

(10) Patent No.: US 10,519,388 B2
(45) Date of Patent: Dec. 31, 2019

(54) PROCESS AND APPARATUS FOR SELECTIVELY HYDROGENATING DIOLEFINS

(71) Applicant: UOP LLC, Des Plaines, IL (US)

(72) Inventors: Steven F. Zink, Westmont, IL (US); Krishna Mani, Haryana (IN); Krishan Pratap Jadaun, Rajasthan (IN); Soumendra Mohan Banerjee, New Delhi (IN)

(73) Assignee: UOP LLC, Des Plaines, IL (US)

( * ) Notice: Subject to any disclaimer, the term of this patent is extended or adjusted under 35 U.S.C. 154(b) by 129 days.

(21) Appl. No.: 15/798,361

(22) Filed: Oct. 30, 2017

(65) Prior Publication Data

US 2018/0044600 A1    Feb. 15, 2018

Related U.S. Application Data

(63) Continuation of application No. PCT/US2016/038734, filed on Jun. 22, 2016.

(60) Provisional application No. 62/186,830, filed on Jun. 30, 2015.

(51) Int. Cl.
  *C10G 69/04* (2006.01)
  *C10G 45/32* (2006.01)

(52) U.S. Cl.
  CPC ....... *C10G 69/04* (2013.01); *C10G 2300/205* (2013.01)

(58) Field of Classification Search
  CPC ........ C10G 69/04; C10G 11/18; C10G 45/32; C10G 2300/205; B01J 38/12
  See application file for complete search history.

(56) References Cited

U.S. PATENT DOCUMENTS

| | | | |
|---|---|---|---|
| 5,595,634 A * | 1/1997 | Hearn | B01D 3/009 203/29 |
| 6,858,133 B2 | 2/2005 | Dath et al. | |
| 7,312,370 B2 | 12/2007 | Pittman et al. | |
| 7,763,165 B1 | 7/2010 | Schultz | |
| 8,747,654 B2 | 6/2014 | Ulas et al. | |
| 8,911,693 B2 | 12/2014 | Zhu et al. | |
| 8,974,660 B2 | 3/2015 | Tanaka et al. | |
| 2011/0243799 A1* | 10/2011 | da Silva Ferreira Alves | B01J 8/0453 422/142 |
| 2014/0171705 A1 | 6/2014 | Freet et al. | |

OTHER PUBLICATIONS

Wier, "Optimizing Naphtha Complexes in the Tight Oil Boom". UOP LLC, a Honeywell Company Des Plaines, Illinois, USA, 2014, pp. 1-39, p. 23, paragraph 4.
Search Report dated Nov. 24, 2016 for corresponding PCT Appl. No. PCT/US2016/038734.

* cited by examiner

*Primary Examiner* — Randy Boyer
*Assistant Examiner* — Juan C Valencia
(74) *Attorney, Agent, or Firm* — Paschall & Maas Law Office, LLC; James C. Paschall

(57) ABSTRACT

The present invention discloses a process and apparatus for selectively hydrogenating diolefins in a cracked stream. The method combines a conversion unit and a recovery section. The recovery section includes the diolefin hydrogenation reactor that is used to selectively hydrogenate the diolefins in the cracked naphtha. The diolefin depleted naphtha may be debutanized to separate the stabilized naphtha and liquefied petroleum gas streams.

20 Claims, 2 Drawing Sheets

PROCESS AND APPARATUS FOR SELECTIVELY HYDROGENATING DIOLEFINS

CROSS-REFERENCE TO RELATED APPLICATIONS

This application is a Continuation of copending International Application No. PCT/US2016/038734 filed Jun. 22, 2016 which application claims benefit of U.S. Provisional Application No. 62/186,830 filed Jun. 30, 2015, the contents of which cited applications are hereby incorporated by reference in their entirety.

BACKGROUND

The field is a process and apparatus for selectively hydrogenating diolefins in a cracked stream.

Fluid catalytic cracking (FCC) is a catalytic hydrocarbon conversion process accomplished by contacting heavier hydrocarbons in a fluidized reaction zone with a catalytic particulate material. The reaction in catalytic cracking, as opposed to hydrocracking, is carried out in the absence of substantial added hydrogen or the consumption of hydrogen. Various products may be produced from such a process, including a naphtha product and/or a light product such as propylene and/or ethylene.

Delayed coking is a thermal cracking process used in petroleum refineries to upgrade and convert petroleum residuum, which are typically the bottoms from atmospheric and vacuum distillation of crude oil, into gas and liquid product streams leaving behind petroleum coke as a solid concentrated carbon material. In the practice of delayed coking process, a hydrocarbon residuum is heated to coking temperature in a coker furnace, and the heated residuum is then passed to a coking drum where it decomposes into volatile components and delayed coke. The delayed coking process has been used for several decades, primarily as a means of producing useful products from the low value residuum of a petroleum refining operation.

Gasoline regulations are increasingly creating a need to treat various refinery streams and products. The petroleum distillates often contain unwanted heteroatom contaminants such as sulfur and nitrogen. In addition to sulfur and nitrogen compounds, mixed refinery streams contain a broad spectrum of olefinic compounds. This is especially true of products from delayed coking, fluidized catalytic cracking, ebullated-bed cracking, and/or slurry cracking which crack heavier hydrocarbon molecules into lighter hydrocarbon molecules by a hydrogen transfer mechanism. Diolefins in cracked naphtha streams can be detrimental in further downstream processing due to fouling via polymerization of tri- and di-unsaturated hydrocarbons and nitrogen species and act as catalyst poisons in petrochemicals applications like in the manufacture of polypropylene and tertiary amyl methyl ether.

Therefore, there is a need for a new process configuration to convert the cracked streams from conversion units like FCC and delayed coking units containing at least tri- and di-unsaturated hydrocarbon, mercaptans, sulfides and/or nitrogen compounds to prevent undesirable conditions in downstream applications. Conventionally, removal of di- and tri-olefins from recovered product streams, i.e., the liquefied petroleum gas (LPG) and naphtha streams, is typically accomplished separately, downstream of the gas recovery section. There is a need for improved processes to remove the di- and tri-olefins from the naphtha and LPG streams in an efficient manner.

SUMMARY

An embodiment is a process for selectively hydrogenating diolefins in a cracked stream comprising cracking a hydrocarbon feed stream at elevated temperature to provide a cracked stream. The cracked stream is fractionated to provide a liquid, cracked stream that is subsequently stripped to remove dry gas from the liquid, cracked stream and to provide a stripped, liquid cracked stream. The stripped, liquid cracked stream is debutanized to provide a naphtha stream and an LPG stream. The diolefins in the liquid, cracked stream are selectively hydrogenated prior to the debutanizing step to provide a diolefin depleted, liquid cracked stream in the presence of a first hydrogen stream.

Another embodiment is a process for selectively hydrogenating diolefins in a cracked stream comprising cracking a hydrocarbon feed stream at elevated temperature to provide a cracked stream. The cracked stream is fractionated to provide a liquid, cracked stream that is subsequently stripped to remove dry gas from the liquid, cracked stream and to provide a stripped, liquid cracked stream. The diolefins in the stripped, liquid cracked stream are selectively hydrogenated to provide a diolefin depleted, liquid cracked stream in the presence of a first hydrogen stream. The diolefin depleted, liquid cracked stream is debutanized to provide a naphtha stream and an LPG stream.

A further embodiment is a process for selectively hydrogenating diolefins in a cracked stream comprising cracking a hydrocarbon feed stream at elevated temperature to provide a cracked stream. The cracked stream is fractionated to provide a liquid, cracked stream that is subsequently stripped to remove dry gas from the liquid cracked stream and to provide a stripped, liquid cracked stream. The diolefins in the liquid cracked stream are selectively hydrogenated to provide a diolefin depleted, liquid cracked stream in the presence of a first hydrogen stream. The diolefin depleted, liquid cracked stream is debutanized in a debutanizer column to provide a naphtha stream and an LPG stream. A recycle hydrogen gas stream from the overhead of the debutanizer column is recovered and a first hydrogen stream is taken from the recycle hydrogen stream.

An embodiment is an apparatus for selectively hydrogenating diolefins in a cracked stream comprising a cracking reactor for cracking a hydrocarbon feed stream at elevated temperature to provide a cracked stream. A fractionation column in downstream communication with the cracking reactor is for fractionating the cracked stream to provide a liquid, cracked stream. A stripping column in downstream communication with the fractionation column is for stripping the liquid cracked stream to remove dry gas from the liquid, cracked stream and to provide a stripped, liquid cracked stream. A debutanizer column in downstream communication with the stripping column is for debutanizing the stripped, liquid cracked stream to provide a naphtha stream and an LPG stream. A diolefin hydrogenation reactor in upstream communication with the debutanizer column is for selectively hydrogenating diolefins in the liquid, cracked stream to provide a diolefin depleted, liquid cracked stream.

Another embodiment is an apparatus for selectively hydrogenating diolefins in a cracked stream comprising a cracking reactor for cracking a hydrocarbon feed stream at elevated temperature to provide a cracked stream. A fractionation column in downstream communication with the cracking reactor is for fractionating the cracked stream to provide a liquid, cracked stream. A stripping column in downstream communication with the fractionation column is for stripping the liquid, cracked stream to remove dry gas from the liquid, cracked stream and to provide a stripped, liquid cracked stream. A debutanizer column in downstream communication with the stripping column is for debutanizing the stripped, liquid cracked stream to provide a naphtha stream and an LPG stream. A diolefin hydrogenation reactor in upstream communication with the debutanizer column and in downstream communication with the stripping column is for selectively hydrogenating diolefins in the liquid, cracked stream to provide a diolefin depleted, liquid cracked stream.

A further embodiment is an apparatus for selectively hydrogenating diolefins in a cracked stream comprising a cracking reactor for cracking a hydrocarbon feed stream at elevated temperature to provide a cracked stream. A fractionation column in downstream communication with the cracking reactor is for fractionating the cracked stream to provide a liquid, cracked stream. A stripping column in downstream communication with the fractionation column is for stripping the liquid, cracked stream to remove dry gas from the liquid cracked stream and to provide a stripped, liquid cracked stream. A debutanizer column in downstream communication with the stripping column is for debutanizing the stripped, liquid cracked stream to provide a naphtha stream and an LPG stream. A diolefin hydrogenation reactor in upstream communication with the debutanizer column and in downstream communication with the fractionation column is for selectively hydrogenating diolefins in the liquid, cracked stream to provide a diolefin depleted, liquid cracked stream.

It is an advantage to selectively hydrogenate the diolefins in cracked naphtha and LPG stream upstream of the debutanizer column to avoid the detrimental effect of the diolefins downstream of the debutanizer column. These and other features, aspects, and advantages of the present invention will become better understood upon consideration of the following detailed description, drawings and appended claims.

DEFINITIONS

As used herein, the following terms have the corresponding definitions.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

The term "column" means a distillation column or columns for separating one or more components of different volatilities which may have a reboiler on its bottom and a condenser on its overhead. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the outlet of the column. The bottom temperature is the liquid bottom outlet temperature.

As used herein, the term "separator" means a vessel which has an inlet and at least two outlets for separating material entering the inlet to provide streams exiting the outlets.

The term "$C_x$ hydrocarbons" wherein "x" is an integer means hydrocarbons having x carbon atoms.

The term "$C_x^-$" wherein "x" is an integer means a hydrocarbon stream with hydrocarbons having x and/or less carbon atoms and preferably x and less carbon atoms.

The term "$C_x^+$" wherein "x" is an integer means a hydrocarbon stream with hydrocarbons having x and/or more carbon atoms and preferably x and more carbon atoms.

The term "predominant" means a majority, suitably at least 80 wt % and preferably at least 90 wt %.

DETAILED DESCRIPTION

A general understanding of the process and apparatus for selectively hydrogenating diolefins in a cracked stream can be obtained by reference to the Figures. The Figures have been simplified by the deletion of a large number of apparatuses customarily employed in a process of this nature, such as vessel internals, temperature and pressure controls systems, flow control valves, recycle pumps, etc. which are not specifically required to illustrate the performance of the invention. Furthermore, the illustration of the process of this invention in the embodiment of a specific drawing is not intended to limit the invention to specific embodiments set out herein.

Figure 1:
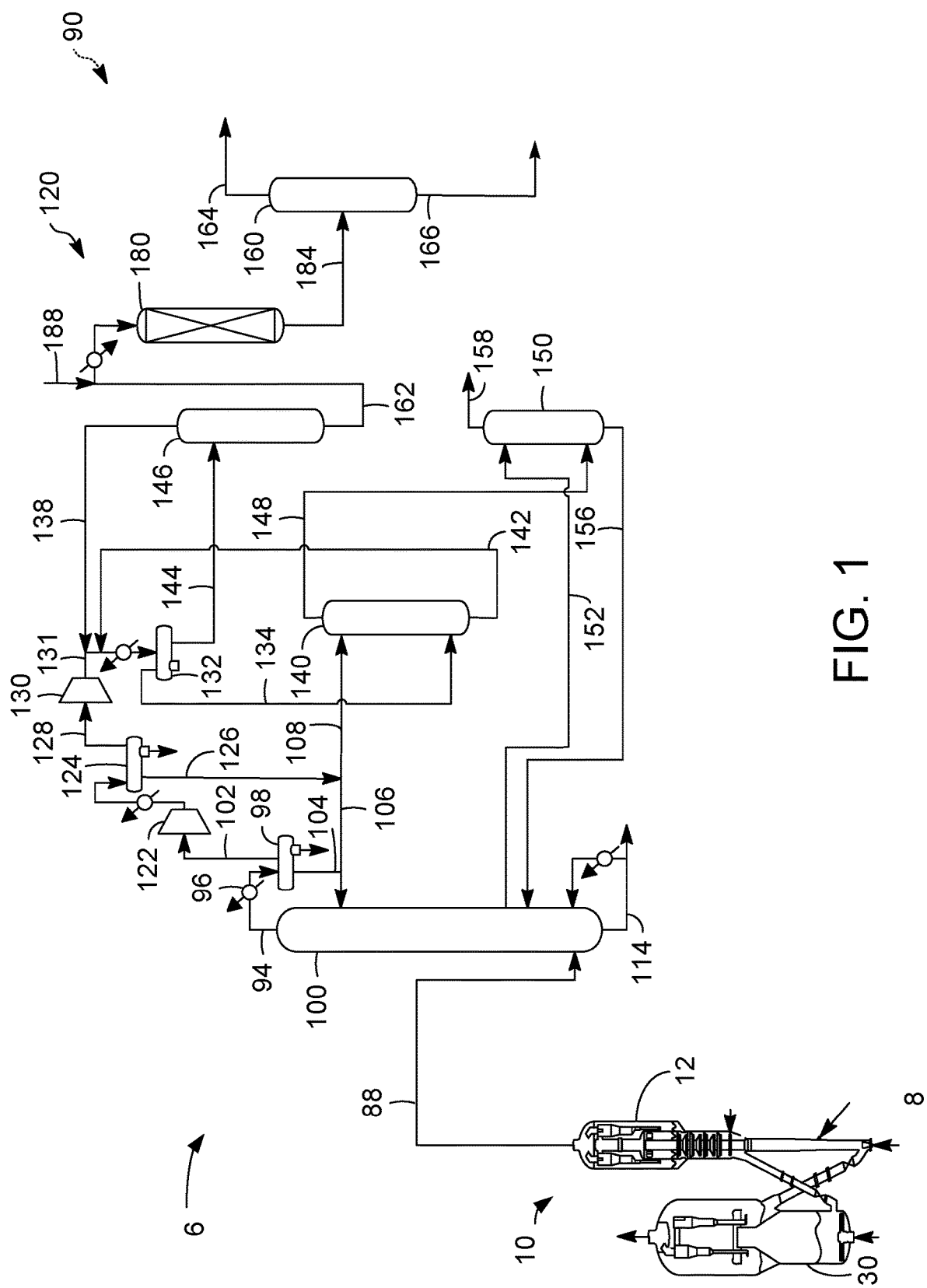
FIG. 1 is a flow scheme for the process and apparatus of the present invention.

A process and apparatus 6 for removing di- and tri-olefins may be described with reference to two components shown in FIG. 1: a conversion unit 10 and a recovery section 90. Exemplary conversion units 10 would be a fluidized catalytic cracking unit, an ebullated bed, a slurry hydrocracking unit and a delayed coking unit. Many configurations of the present invention are possible, but specific embodiments are presented herein by way of example. The conversion unit 10 for cracking a hydrocarbon feed stream at elevated temperature to provide a cracked stream may be an FCC reactor. In the embodiment of FIG. 1 the conversion unit 10 comprises an FCC reactor 12.

A conventional FCC feedstock and higher boiling hydrocarbon feedstock is a suitable hydrocarbon feedstream in line 8 to the FCC reactor 12. The most common of such conventional feedstocks is a "vacuum gas oil" (VGO), which is typically a hydrocarbon material having a boiling range of from 343° C. (650° F.) to 552° C. (1025° F.) prepared by vacuum fractionation of atmospheric residue. Such a fraction is generally low in coke precursors and heavy metal contamination which can serve to contaminate catalyst. Heavy hydrocarbon feedstocks to which this invention may be applied include heavy bottoms from crude oil, heavy bitumen crude oil, shale oil, tar sand extract, deasphalted residue, products from coal liquefaction, atmospheric and vacuum reduced crudes. Heavy feedstocks for this invention also include mixtures of the above hydrocarbons and the foregoing list is not comprehensive. Moreover, additional amounts of feed may also be introduced downstream of the initial feed point.

The conversion unit 10, which may be an FCC reactor 12, can operate at any suitable temperature, and typically operates at a temperature of about 150° C. to about 580° C., preferably about 520° C. to about 580° C. at the reactor outlet. In one exemplary embodiment, a high temperature may be desired, such as no less than about 565° C. at the outlet and a pressure of about 69 kPa (10 psig) to about 517 kPa (gauge) (75 psig) but typically less than about 275 kPa (gauge) (40 psig). The catalyst-to-oil ratio, based on the weight of catalyst and feed hydrocarbons entering the bottom of the reactor, may range up to 30:1 but is typically between about 4:1 and about 25:1. Hydrogen is not normally added to the reactor. Steam may be passed into the reactor 10 equivalent to about 2 wt % to about 35 wt % of feed. Typically, however, the steam rate may be between about 2 wt % and about 7 wt % for maximum gasoline production and about 10 wt % to about 30 wt % for maximum light olefin production. The average residence time of catalyst in the reactor may be less than about 5 seconds.

The catalyst in the conversion unit 10 can be a single catalyst or a mixture of different catalysts. Usually, the catalyst includes two components or catalysts, namely a first component or catalyst and a second component or catalyst. Such a catalyst mixture is disclosed in, e.g., U.S. Pat. No. 7,312,370. Generally, the first component may include any of the well-known catalysts that are used in the art of FCC, such as an active amorphous clay-type catalyst and/or a high activity, crystalline molecular sieve. Zeolites may be used as molecular sieves in FCC processes. Preferably, the first component includes a large pore zeolite, such as a Y-type zeolite, an active alumina material, a binder material, including either silica or alumina, and an inert filler such as kaolin.

Typically, the zeolitic molecular sieves appropriate for the first component have a large average pore size. Usually, molecular sieves with a large pore size have pores with openings of greater than about 0.7 nanometers in effective diameter defined by greater than about 10, and typically about 12, member rings. Suitable large pore zeolite components may include synthetic zeolites such as X and Y zeolites, mordenite and faujasite. A portion of the first component, such as the zeolite, can have any suitable amount of a rare earth metal or rare earth metal oxide.

The second component may include a medium or smaller pore zeolite catalyst, such as a MFI zeolite, as exemplified by at least one of ZSM-5, ZSM-11, ZSM-12, ZSM-23, ZSM-35, ZSM-38, ZSM-48, ferrierite, erionite and other similar materials. Preferably, the second component has the medium or smaller pore zeolite dispersed on a matrix including a binder material such as silica or alumina and an inert filler material such as kaolin.

The hydrocarbon stream in line 8 is contacted with a cracking catalyst to crack the hydrocarbons to produce a cracked stream and deposit coke on the cracking catalyst and to provide a coked cracking catalyst. The coked cracking catalyst is separated from the cracked stream. An oxygen stream is added to the coked cracking catalyst to combust coke on the coked cracking catalyst and to regenerate the cracking catalyst.

An effluent stream of the conversion unit 10 comprising cracked products in the line 88, relatively free of catalyst particles, exits the FCC reactor 12. The effluent stream in the line 88 may be subjected to additional treatment to remove fine catalyst particles or to further prepare the stream prior to fractionation. The line 88 transfers the cracked products streams to the fractionation section 90 that in an embodiment may include a main fractionation column 100 and a gas recovery section 120. The fractionation section fractionates the cracked stream to provide a liquid cracked stream.

The main column 100 is a fractionation column with trays and/or packing positioned along its height for vapor and liquid to contact and reach equilibrium proportions at tray conditions and a series of pump-arounds to cool the contents of the main column. The main fractionation column is in downstream communication with the FCC reactor 12 to fractionate the cracked stream and to provide a liquid, cracked stream. The fractionation column can be operated with a top pressure of about 35 kPa (5 psig) to about 172 kPa (gauge) (25 psig) and a bottom temperature of about 343° C. (650° F.) to about 399° C. (750° F.). In the product recovery section 90, the gaseous FCC product in line 88 is directed to a lower section of an FCC main fractionation column 100. A variety of products are withdrawn from the main column 100. In this case, the main column 100 recovers an overhead stream of light products comprising unstabilized naphtha and lighter gases in an overhead line 94. The overhead stream in line 94 is condensed in a condenser and perhaps cooled in a cooler, both represented by 96 before it enters a receiver 98 in downstream communication with the FCC reactor 12. A net overhead line 102 withdraws a light off-gas stream of LPG and dry gas from the receiver 98. An aqueous stream is removed from a boot in the receiver 98. A bottoms liquid stream of light unstabilized naphtha leaves the receiver 98 via a line 104.

The gas recovery section 120 is shown to be an absorption based system, but any vapor recovery system may be used including a cold box system. To obtain sufficient separation of light gas components, the gaseous stream in the net overhead line 102 is compressed in a compressor 122, also known as a wet gas compressor, which is in downstream communication with the main fractionation column overhead receiver 98. Any number of compressor stages may be used, but typically dual stage compression is utilized. In dual stage compression, compressed fluid from compressor 122 is cooled and enters an interstage compressor receiver 124 in downstream communication with the compressor 122. Liquid in line 126 from a bottom of the compressor receiver 124 and the unstabilized naphtha in line 106 from the main fractionation column overhead receiver 98 flow into a primary absorber column 140 in downstream communication with the compressor receiver 124 to serve as an absorbent. In an embodiment, these streams may join and flow into the primary absorbent column 140 together in line 108. In an embodiment, the primary absorbent column 140 is in direct downstream communication with the bottom of the overhead receiver 98 of the main fractionation column 100 and/or a bottom of the interstage compressor receiver 124. Gas in line 128 from a top of the compressor receiver 124 enters an optional second compressor 130, also known as a wet gas compressor, in downstream communication with the compressor receiver 124. The first compression stage may compress gaseous fluids to a pressure of about 345 kPa (50 psig) to about 1034 kPa (gauge) (150 psig) and preferably about 482 kPa (70 psig) to about 690 kPa (gauge) (100 psig). The second compression stage may compress gaseous fluids to a pressure of about 1241 kPa (180 psig) to about 2068 kPa (gauge) (300 psig).

Compressed effluent from the second compressor 130 in line 131 is joined by streams in lines 138 and 142, and gaseous components are partially condensed and all flow to a second compressor receiver 132 in downstream communication with the second compressor 130. Compressed gas from a top of the second compressor receiver 132 travels in line 134 to enter a primary absorber column 140 at a lower point than an entry point for the liquid stream in line 126 from a bottom of the compressor receiver 124 and the unstabilized naphtha in line 106 from the main fractionation column overhead receiver 98 via line 108. The primary absorber column 140 is in downstream communication with an overhead of the second compressor receiver 132. The primary absorber column 140 is also in downstream communication with the fractionation column 100. A compressor receiver liquid cracked stream from a bottom of the second compressor receiver 132 travels in line 144 to a stripper column 146.

The gaseous hydrocarbon cracked stream in line 134 fed to the primary absorber column 140 is contacted with liquid, cracked stream in line 126 from a bottom of the compressor receiver 124 and the unstabilized naphtha in line 106 from the main fractionation column overhead receiver 98 via line 108 to absorb heavier components in the gaseous cracked stream effecting a separation between $C_3^+$ and $C_2^-$ hydrocarbons by absorption of the heavier hydrocarbons into the naphtha stream upon counter-current contact. The absorption in the primary absorber column provides a liquid cracked stream in line 142 and an off-gas stream in line 148. A first hydrogen stream may be taken from the off-gas stream in line 148. The primary absorber column 140 may utilize no condenser or reboiler but may have one or more pump-arounds to cool the materials in the column. The primary absorber column may be operated at a top pressure of about 1034 kPa (150 psig) to about 2068 kPa (gauge) (300 psig) and a bottom temperature of about 27° C. (80° F.) to about 66° C. (150° F.). The liquid $C_3^+$ cracked stream in line 142 from the bottoms of the primary absorber column is returned to line 131 upstream of condenser to be cooled and returned to the second compressor receiver 132. The off-gas stream in line 148 from a top of the primary absorber 140 is directed to a lower end of a secondary or sponge absorber 150. A circulating stream of light cycle oil (LCO) in line 152 absorbs most of the remaining $C_5^+$ material and some $C_3$-$C_4$ material in the off-gas stream in line 148 by counter-current contact. LCO from a bottom of the secondary absorber in line 156 richer in $C_3^+$ material than the circulating stream in line 152 is returned in line 156 to the main column 100.

The secondary absorber column 150 may be operated at a top pressure just below the pressure of the primary absorber column 140 of about 965 kPa (140 psig) to about 2000 kPa (gauge) (290 psig) and a bottom temperature of about 38° C. (100° F.) to about 66° C. (150° F.). The overhead stream of the secondary absorber column 150 comprising dry gas of predominantly $C_2^-$ hydrocarbons with hydrogen sulfide, amines and hydrogen is removed in line 158 and may be subjected to further separation to recover ethylene and hydrogen.

Compressor receiver liquid cracked stream in compressor receiver bottoms line 144 from a bottom of the second compressor receiver 132 is sent to the stripper column 146. The compressor receiver liquid, cracked stream in line 144 is stripped to remove dry gas from the liquid, cracked stream and provide a stripped, liquid cracked stream. Most of the $C_2^-$ material is stripped from the $C_3$-$C_7$ material and removed in a stripper overhead line 138 of the stripper column 146. The overhead gas in overhead line 138 from the stripper column 146 comprising $C_2^-$ material, LPG and some naphtha is returned to line 131 without first undergoing condensation. The condenser on line 131 will partially condense the overhead stream from overhead line 138 with the gas compressor discharge in line 131. The partially condensed overhead stream from line 138 and gas compressor discharge in line 131 will undergo vapor-liquid separation with the bottoms stream in the primary absorber bottoms line 142 from the primary absorber column 140 in the second compressor receiver 132. The stripper column 146 is in downstream communication with the FCC reactor 12, a bottom of the second compressor receiver 132 and the primary absorber column 140.

The stripper column 146 is in downstream communication with the fractionation column 100 to strip the liquid, cracked stream in line 144 to remove the dry gas from the liquid cracked stream and provide a stripped, liquid cracked stream in a bottoms line 162. The bottoms product of the stripper column 146 in the bottoms line 162 is rich in naphtha. The stripper column 146 may be run at a pressure above the compressor 130 discharge at about 1379 kPa (200 psig) to about 2206 kPa (gauge) (320 psig) and a temperature of about 38° C. (100° F.) to about 149° C. (300° F.).

FIG. 1 shows that the liquid bottoms stream from the stripper column 146 comprising a stripped liquid cracked stream in line 162 may be passed to a debutanizer column 160. The debutanizer column 160 is in downstream communication with the FCC reactor 12, a bottom of the second compressor receiver 132 and the bottom of the primary absorber 140. The debutanizer column 160 is in downstream communication with the stripper column to debutanize the stripped, liquid cracked stream. The debutanizer column 160 may debutanize the stripped, liquid cracked stream in line 162 to provide a naphtha stream in line 166 and an overhead LPG stream in line 164. The debutanizer column may be operated at a top pressure of about 1034 kPa (150 psig) to about 2068 kPa (gauge) (300 psig) and a bottom temperature of about 149° C. (300° F.) to about 204° C. (400° F.).

A liquid cracked stream from the fractionator 100 may be sent to a diolefin hydrogenation reactor 180. The diolefin hydrogenation reactor 180 may be upstream of the debutanizer column 160 to selectively hydrogenate diolefins in a liquid cracked stream, preferably, the stripped, liquid cracked stream in line 162 and provide a diolefin depleted, liquid cracked stream. The diolefin hydrogenation reactor 180 may be in downstream communication with the FCC reactor 12, a bottoms line 144 of the second compressor receiver 132 and a bottoms line 142 of the primary absorber 140. The diolefin hydrogenation reactor 180 may be in downstream communication with the fractionation column 100 and the stripper column 146 to selectively hydrogenate the diolefins in the presence of a first hydrogen stream and provide a diolefin depleted, liquid cracked stream in line 184. The diolefin hydrogenation reactor 180 may be run at a pressure about 1034 kPa (150 psig) to about 4482 kPa (gauge) (650 psig) and a temperature about 140° C. (284° F.) to about 205° C. (400° F.) and a gas-to-oil ratio of about 3 to 34 $Nm^3/m^3$ (20 to about 200 scf/bbl), such that the gas composition is comprised mostly of hydrogen. A first hydrogen stream in line 188 may be fed optionally to the diolefin hydrogenation reactor 180 along with the stripped liquid cracked stream in line 162. The hydrogen stream in line 188 may be a make-up hydrogen stream. In the diolefin hydrogenation reactor 180, di and tri-olefins are selectively hydrogenated to mono-olefins in the presence of hydrogen and hydrogenating catalyst. The hydrogenating catalyst can be nickel-molybdenum catalyst supported on alumina. Other unstabilized naphtha streams from the fractionation column 100 may be sent to the diolefin hydrogenation reactor 180 for selective hydrogenation. The diolefin hydrogenation reactor 180 may selectively hydrogenate the diolefins in the liquid cracked stream prior to the debutanizing step to provide a diolefin depleted, liquid cracked stream in line 184 in the presence of the first hydrogen stream in line 188. The diolefin depleted, liquid cracked stream in line 184 may be sent to the debutanizer column 160 in downstream communication with the diolefin hydrogenation reactor 180. The debutanizer column 160 may debutanize the diolefin depleted, liquid cracked stream in line 184 to provide a naphtha stream in line 166 and an overhead LPG stream in line 164. The LPG stream in line 164 may have less than 100 wppm sulfur and preferably less than 50 wppm sulfur. The diene concentration in the debutanized naphtha stream in line 166 and in LPG stream in line 164 may each be preferably less than about 0.30 wt % diene. The LPG stream in line 164 has very little sulfur and diene content, so does not require any further downstream treatment. The LPG in line 164 may be directly transported for further use in an alkylation unit.

The selective hydrogenation of the diolefins using the diolefin hydrogenation reactor 180 in the gas concentration section eliminates the need for further hydrotreatment of the diolefins downstream and consequent undesirable downstream reactions like fouling via polymerization of tri- and di-unsaturated hydrocarbons. The cracked naphtha going to storage is free of diolefins and consequently can be stored in tanks for long periods without significant gum formation.

Figure 2:
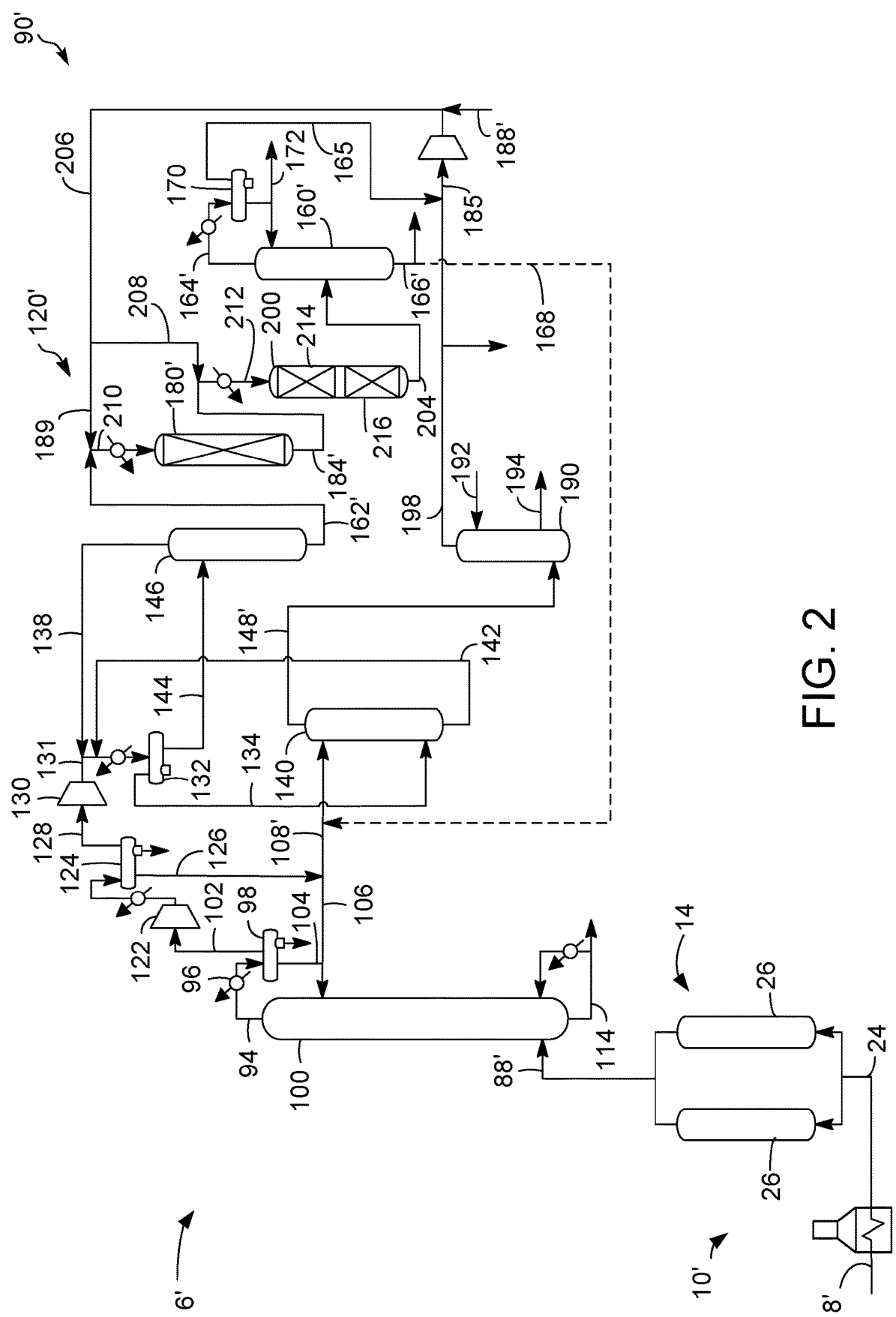
FIG. 2 is another embodiment of the process and apparatus of the present invention.

Turning now to FIG. 2, another embodiment of the present invention is an apparatus and process that may be described with reference to two components shown in FIG. 1: a conversion unit 10' and a recovery section 90'. The embodiment of FIG. 2 differs from the embodiment of FIG. 1 in that the conversion unit 10' comprises a coking reactor 14 instead of an FCC reactor 12. The embodiment of FIG. 2 further differs from embodiment of FIG. 1 in that the effluent from the diolefin hydrogenation reactor is sent to a decontaminant column 200 that may comprise a silicon trap section comprising a silicon trap bed 214 of silicon trapping adsorbent and/or a demetallization section comprising a demetallization bed 216 of demetallization catalyst. The similar components in FIG. 2 that were described above for FIG. 1 will not be described again for FIG. 2. Many of the elements in FIG. 2 have the same configuration as in FIG. 1 and bear the same reference number. Elements in FIG. 2 that correspond to elements in FIG. 1 but have a different configuration bear the same reference numeral as in FIG. 1 but are marked with a prime symbol (').

A conventional coking reactor feedstock includes but is not limited to residues from atmospheric and vacuum distillation of petroleum crudes or the atmospheric or vacuum distillation of heavy oils, visbroken resids, or tars from deasphalting units. Atmospheric and vacuum topped heavy bitumens can also be used as coking reactor feedstock. These heavy feedstocks contain asphaltenes, which have high molecular weight, are highly aromatic and have high levels of metals. The most common of such conventional feedstocks is a vacuum residue. Typically, the feedstock is a high boiling hydrocarbonaceous material having a nominal initial boiling point range of greater than about 525° C. (977° F.), an API gravity of about 20° or less, and a Conradson carbon residue content of about 0.1 wt % to about 40 wt %. The heavy feedstocks for this invention also include mixtures of the above hydrocarbons and the foregoing list is not comprehensive. The conversion unit 10', which may be a coking reactor 14, comprises a furnace 24 which is heated to a coking temperature of about 410° C. (770° F.) to about 475° C. (887° F.). The feedstock introduced via line 8' is sent through the furnace 24 to heat it to coking temperature. The heated feedstock is charged to a coke drum 26 at pressures usually ranging between about 135 kPa (20 psig) to about 1378 kPa (200 psig). Typically there are two coke drums, but one or more than two drums can be used. The coking time ranges from about 0.5 hours to about 14 hours. The coke drum is insulated and may also be heated, such as by introduction of heated inert gas into the drum, so as to maintain contents of the drum 26 at a temperature in the range of about 426° C. (800° F.) to about 648° C. (1200° F.). Inside the coke drum(s) 26 the heavy hydrocarbon cracks to form cracked vapors and coke.

The coke may be removed from the lower end of the coke drum (not shown). The product vapors are continuously removed from an overhead of the drum through line 88'. The effluent stream exits the coking reactor comprises cracked products in the line 88'. The overhead vapors from the coke drum(s) carried by line 88' may be subjected to additional treatment to remove fine coke particles or to further prepare the stream prior to fractionation. The line 88' transfers the cracked product stream to the fractionation section 90' that in an embodiment may include a main fractionation column 100 and a gas recovery section 120' very similar to that described with respect to FIG. 1.

FIG. 2 shows that the liquid bottoms stream from the stripper column 146 comprising a stripped, liquid cracked stream in line 162' may be passed to a diolefin hydrogenation reactor 180'. The diolefin hydrogenation reactor 180' may be in downstream communication with the coking reactor 14, a bottoms line 144 of the second compressor receiver 132, a bottoms line 142 of the primary absorber 140 and a bottoms line 162' of the stripper column 146. The diolefin hydrogenation reactor 180' may be operated at a pressure of about 1034 kPa (150 psig) to about 4482 kPa (gauge) (650 psig) and a temperature about 140° C. (284° F.) to about 205° C. (400° F.) and a gas-to-oil ratio of about 3 to 34 $Nm^3/m^3$ (20 to about 200 scf/bbl), such that the gas composition is comprised mostly of hydrogen. The stripped, liquid cracked stream in bottoms line 162' may be mixed with a recycle first hydrogen stream in line 189 and are heated and fed together in line 210 to the diolefin hydrogenation reactor 180' containing a hydrogenating catalyst.

FIG. 2 shows that an off-gas stream in line 148' from a top of the primary absorber 140 is directed to an off-gas scrubber 190 to recover recycle hydrogen. The off-gas stream in overhead line 148' is generated by contacting a cracked stream from the coking reactor 12' with the gaseous hydrocarbon cracked stream in line 134. Contaminants like hydrogen sulfide are removed from the off-gas stream by absorption into an absorbent, such as a lean amine, that may be fed in line 192 to the off-gas scrubber 190 and withdrawn as a rich absorbent stream in line 194 from the off-gas scrubber. The hydrogen sulfide concentration in the scrubbed overhead stream in line 198 from the off-gas scrubber may be preferably less than 200 ppm-volume. The scrubbed overhead stream from the off-gas scrubber in line 198 may be split in two streams. A first portion may be forwarded to a fuel gas header for the refinery. A second portion of the stream is mixed with a recycle hydrogen stream in line 165 to form a combined recycle hydrogen stream in a combined line 185. The recycle hydrogen stream in the combined line 185 may combine with the optional make-up hydrogen stream in line 188' to provide a combined recycle stream in line 206. The recycle hydrogen stream in the combined line 185 may be compressed before combining with the make-up hydrogen stream in line 188'. The combined recycle stream in line 206 may be divided into the first hydrogen stream in line 189 and a second hydrogen stream in line 208. The off-gas scrubber 190 may be operated at a top pressure just below the pressure of the primary absorber column 140 of about 965 kPa (gauge) (140 psig) to about 2000 kPa (gauge) (290 psig) and a bottoms temperature of about 38° C. (100° F.) to about 66° C. (150° F.).

The diolefin hydrogenation reactor 180' may selectively hydrogenate the diolefins in the liquid, cracked stream in the presence of the first hydrogen stream in line 189 to provide a diolefin depleted, liquid cracked stream in line 184'. In an embodiment of the invention, the liquid, cracked stream may be the stripped, liquid cracked stream in line 162'. In a further embodiment of the invention, the diolefin hydrogenation reactor 180' may selectively hydrogenate the diolefins in the liquid, cracked stream prior to a debutanizing step or upstream of the debutanizer column 160' which is in downstream communication with the diolefin hydrogenation reactor 180'.

The diolefin depleted, liquid cracked stream in line 184' from the bottom of the diolefin hydrogenation reactor 180' may be sent to the decontaminant column 200. The diolefin depleted, liquid cracked stream in line 184' may be heated and mixed with the second hydrogen stream in line 208 and fed together in line 212 to an decontaminant column 200.

The decontaminant column 200 may comprise a silicon-trapping bed 214 of silicon trapping adsorbent and/or a demetallization bed 216 of demetallization catalyst in downstream communication with the stripper column 146. The diolefin depleted, liquid cracked stream in line 184' may be contacted with the silicon trapping adsorbent in a silicon-trapping bed 214 of silicon trapping adsorbent such as alumina to adsorb silicon from the diolefin depleted, liquid cracked stream and provide an adsorbed, liquid cracked stream. A silicon-trapping bed 214 of silicon trapping adsorbent may be in downstream communication with the stripper column 146. The silicon-trapping bed 214 of silicon trapping adsorbent can effectively remove the silicon impurities from the diolefin depleted, liquid cracked stream in line 184' that can be a poison in downstream processing. The adsorbed, liquid cracked stream may be subsequently debutanized in a debutanizer column 160'.

The diolefin depleted liquid cracked stream in line 184' from the bottom of the diolefin hydrogenation reactor 180' may be contacted with a demetallization catalyst in a demetallization bed 216 of demetallization catalyst in the presence of the second hydrogen stream in line 208 to demetallize the diolefin depleted, liquid cracked stream and provide a demetallized, liquid cracked stream. The demetallization bed 216 of demetallization catalyst may be in downstream communication with the stripper column 146. The demetallized, liquid cracked stream may be subsequently debutanized in a debutanizer column 160'. Alternatively, the second hydrogen stream may be added to the diolefin depleted, liquid cracked stream in line 184' and the diolefin depleted, liquid cracked stream may be contacted with the silicon-trapping adsorbent to adsorb silicon from the diolefin depleted, liquid cracked stream to provide an adsorbed, liquid cracked stream. The adsorbed, liquid cracked stream may then be contacted with the demetallization catalyst in the presence of the second hydrogen stream to demetallize the diolefin depleted, liquid cracked stream and provide a demetallized, liquid cracked stream in decontaminant line 204. In another alternative embodiment, the second hydrogen stream may be added to the diolefin depleted, liquid cracked stream in line 184' and the diolefin depleted, liquid cracked stream may be contacted with the demetallization catalyst in the presence of the second hydrogen stream to demetallize the diolefin depleted, liquid cracked stream and provide a demetallized, liquid cracked stream. The demetallized, liquid cracked stream may then be contacted with the silicon-trapping adsorbent to adsorb silicon from the demetallized, liquid cracked stream to provide an adsorbed, liquid cracked stream in decontaminant line 204. The decontaminant column 200 may be operated at a temperature of between about 230° C. (450° F.) and about 340° C. (650° F.) and a pressure of about 17 barg (250 psig) to about 41 barg (600 psig).

The decontaminant stream of the decontaminant column 200 in decontaminant line 204 comprises the diolefin depleted, adsorbed and/or demetallized, liquid cracked stream depleted of silicon and/or metals. The diolefin depleted, decontaminant, liquid cracked stream in decontaminant line 204 may be sent to the debutanizer column 160'. The debutanizer column 160' may be in downstream communication with the coking reactor 14, a bottoms line 144 of the second compressor receiver 132, a bottoms line 142 of the primary absorber 140, a product line 184' of the diolefin hydrogenation reactor 180' and a decontaminant line 204 of the decontaminant column 200. The debutanizer column 160' may be in downstream communication with the silicon-trapping bed 214 of silicon trapping adsorbent and the demetallization bed 216 of demetallization catalyst. The debutanizer column 160' may debutanize the diolefin depleted, decontaminant, liquid cracked stream in decontaminant line 204 from the bottom of decontaminant column 200 to provide a stabilized naphtha stream in line 166' and an overhead LPG stream in line 164'. A portion of the stabilized naphtha in line 166' may be recycled back in optional phantom line 168 to the primary absorber 140 to serve as at least a portion of the primary absorbent.

An overhead stream in overhead line 164' from an overhead of the debutanizer column 160' is passed to a receiver 170 to recover a recycle hydrogen gas stream comprising hydrogen in a net overhead line 165. The recycle hydrogen gas stream in the net overhead line 165 may be mixed with the clean hydrogen stream in line 198 from the scrubber 190 to provide the combined recycle hydrogen stream in the combined line 185. The receiver 170 is in downstream communication with the overhead of the debutanizer column 160'. The first hydrogen stream in line 189 and second hydrogen stream in line 208 may be taken from the recycle hydrogen stream in the combined line 185. The unreacted hydrogen gas in the net overhead line 165 of the debutanizer is recycled back to supplement or supplant an optional make-up hydrogen stream in line 188' such that the gas-to-oil ratio of about 8 to 85 $Nm^3/m^3$ (50 to about 500 scf/bbl), such that the gas composition is comprised mostly of hydrogen, is maintained in the decontaminant column 200. In an aspect, the unreacted hydrogen in the net overhead line 165 with the scrubbed recycle hydrogen in line 198 may be sufficient to provide the entire hydrogen requirement for he decontaminant column 200. The receiver 170 also produces a net condensed LPG stream in a bottoms line 172. The LPG stream in line 172 may have less than 100 wppm sulfur and preferably less than 50 wppm sulfur. The diene concentration in the debutanized naphtha stream in line 166' and in the LPG stream in line 172 may be preferably less than 0.30 wt % diene. The LPG stream in line 172 has very little sulfur and diene content, so does not require any further downstream treatment. The LPG stream in line 172 may be directly transported for further use to an alkylation unit.

The debutanizer column may be operated at a top pressure of about 1034 kPa (150 psig) to about 2068 kPa (gauge) (300 psig) and a bottom temperature of about 149° C. (300° F.) to about 204° C. (400° F.).

The selective hydrogenation of the diolefins in the liquid, cracked stream using the diolefin hydrogenation reactor in the gas concentration section eliminates the need for further hydrotreatment of the diolefins in downstream processing and makes the operation of conversion unit independent of operation of a downstream hydrotreating unit. The cracked naphtha going to storage is free of diolefins and as a result, avoids extensive gum formation during long tank storage. Processing the diolefin-depleted liquid, cracked stream in the decontaminant column 200 also eliminates the need for further decontamination in downstream processing. These embodiments can also be practiced such that at least a portion and sometimes all of the hydrogen required by the diolefin hydrogenation reactor 180' and the decontaminant column 200 is supplied by recycle hydrogen.

Specific Embodiments

While the following is described in conjunction with specific embodiments, it will be understood that this description is intended to illustrate and not limit the scope of the preceding description and the appended claims.

A first embodiment of the invention is a process for selectively hydrogenating diolefins in a cracked stream comprising (i) cracking a hydrocarbon feed stream at elevated temperature to provide a cracked stream to provide a liquid cracked stream; (ii) fractionating the cracked stream to provide a liquid cracked stream; (iii) stripping the liquid cracked stream to remove dry gas from the liquid cracked stream and provide a stripped, liquid cracked stream; (iv) debutanizing the stripped, liquid cracked stream to provide a naphtha stream and a liquefied petroleum gas stream; and (v) selectively hydrogenating diolefins in the liquid cracked stream prior to the debutanizing step to provide a diolefin depleted, liquid cracked stream in the presence of a first hydrogen stream. An embodiment of the invention is one, any or all of prior embodiments in this paragraph up through the first embodiment in this paragraph further comprising contacting the diolefin depleted, liquid cracked stream with an adsorbent to adsorb silicon from the diolefin depleted, liquid cracked stream. An embodiment of the invention is one, any or all of prior embodiments in this paragraph up through the first embodiment in this paragraph further comprising contacting the diolefin depleted liquid cracked stream with a demetallization catalyst in the presence of a second hydrogen to demetallize the diolefin depleted, liquid cracked stream. An embodiment of the invention is one, any or all of prior embodiments in this paragraph up through the first embodiment in this paragraph further comprising adding a second hydrogen stream to the diolefin depleted, liquid cracked stream, contacting the diolefin depleted, liquid cracked stream with an adsorbent to adsorb silicon from the diolefin depleted, liquid cracked stream; and contacting the diolefin depleted, liquid cracked stream with a demetallization catalyst in the presence of the second hydrogen stream to demetallize the diolefin depleted, liquid cracked stream. An embodiment of the invention is one, any or all of prior embodiments in this paragraph up through the first embodiment in this paragraph wherein fractionating the cracked stream further comprises contacting the cracked stream with a gaseous cracked stream to absorb heavier components in the gaseous cracked stream to provide the liquid cracked stream and an off-gas stream; and taking the first hydrogen stream and the second hydrogen stream from the off-gas stream. An embodiment of the invention is one, any or all of prior embodiments in this paragraph up through the first embodiment in this paragraph further comprising selectively hydrogenating diolefins in the stripped cracked stream, recovering a recycle hydrogen gas stream from an overhead of the debutanizer column and taking the first hydrogen stream from the recycle hydrogen stream. An embodiment of the invention is one, any or all of prior embodiments in this paragraph up through the first embodiment in this paragraph further comprising contacting the hydrocarbon feed stream with a cracking catalyst to crack the hydrocarbons to produce the cracked stream and deposit coke on the cracking catalyst to provide coked cracking catalyst; separating the coked cracking catalyst from the cracked stream; adding oxygen to the coked cracking catalyst; combusting coke on the coked cracking catalyst with oxygen to regenerate the cracking catalyst. An embodiment of the invention is one, any or all of prior embodiments in this paragraph up through the first embodiment in this paragraph wherein the liquefied petroleum gas stream has less than 100 wppm sulfur.

A second embodiment of the invention is a process for selectively hydrogenating diolefins in a cracked stream comprising (i) cracking a hydrocarbon feed stream at elevated temperature to provide a cracked stream; (ii) fractionating the cracked stream to provide a liquid cracked stream; (iii) stripping the liquid cracked stream to remove dry gas from the liquid cracked stream and provide a stripped, liquid cracked stream; (iv) selectively hydrogenating diolefins in the stripped liquid, cracked stream to provide a diolefin, depleted, liquid cracked stream in the presence of a first hydrogen stream; and (v) debutanizing the diolefin depleted liquid cracked stream to provide a naphtha stream and a liquefied petroleum gas stream. An embodiment of the invention is one, any or all of prior embodiments in this paragraph up through the second embodiment in this paragraph further comprising adding a second hydrogen stream to the diolefin depleted liquid cracked stream, contacting the diolefin depleted liquid cracked stream with an adsorbent to adsorb silicon from the diolefin depleted, liquid cracked stream; and contacting the diolefin depleted, liquid cracked stream with a demetallization catalyst in the presence of the second hydrogen stream to demetallize the diolefin depleted, liquid cracked stream. An embodiment of the invention is one, any or all of prior embodiments in this paragraph up through the second embodiment in this paragraph further comprising recovering a recycle hydrogen gas stream from an overhead of the debutanizer column for debutanizing the diolefin depleted, liquid cracked stream and taking the first hydrogen stream and the second hydrogen stream from the recycle hydrogen stream.

A third embodiment of the invention is a process for selectively hydrogenating olefins in a cracked stream comprising (i) cracking a hydrocarbon feed stream at elevated temperature to provide a cracked stream; (ii) fractionating the cracked stream to provide a liquid cracked stream; (iii) stripping the liquid cracked stream to remove dry gas from the liquid cracked stream and provide a stripped, liquid cracked stream; (iv) selectively hydrogenating diolefins in the liquid cracked stream to provide a diolefin depleted, liquid cracked stream in the presence of a first hydrogen stream; (v) debutanizing the diolefin depleted, liquid cracked stream in a debutanizer column to provide a naphtha stream and a liquefied petroleum gas stream; and (vi) recovering a recycle hydrogen gas stream from an overhead of the debutanizer column and taking the first hydrogen stream from the recycle hydrogen stream. An embodiment of the invention is one, any or all of prior embodiments in this paragraph up through the third embodiment in this paragraph further comprising contacting the diolefin depleted liquid cracked stream with an adsorbent to adsorb silicon from the diolefin depleted, liquid cracked stream. An embodiment of the invention is one, any or all of prior embodiments in this paragraph up through the third embodiment in this paragraph further comprising contacting the diolefin depleted, liquid cracked stream with a demetallization catalyst in the presence of a second hydrogen stream to demetallize the diolefin depleted, liquid cracked stream. An embodiment of the invention is one, any or all of prior embodiments in this paragraph up through the third embodiment in this paragraph further comprising contacting the diolefin depleted, liquid cracked stream with an adsorbent to adsorb silicon from the diolefin depleted, liquid cracked stream; and contacting the diolefin depleted, liquid cracked stream with a demetallization catalyst in the presence of a second hydrogen stream to demetallize the diolefin depleted, liquid cracked stream. An embodiment of the invention is one, any or all of prior embodiments in this paragraph up through the third embodiment in this paragraph wherein fractionating the cracked stream further comprises contacting the cracked stream with a gaseous cracked stream to absorb heavier components in the gaseous cracked stream to provide liquid cracked stream and an off gas stream; and taking the first hydrogen stream from the off-gas stream. An embodiment of the invention is one, any or all of prior embodiments in this paragraph up through the third embodiment in this paragraph further comprising contacting the hydrocarbon feed stream with a cracking catalyst to crack the hydrocarbons to produce the cracked stream and deposit coke on the cracking catalyst to provide coked cracking catalyst; separating the coked cracking catalyst from the cracked stream; adding oxygen to the coked cracking catalyst; combusting coke on the coked cracking catalyst with oxygen to regenerate the cracking catalyst. An embodiment of the invention is one, any or all of prior embodiments in this paragraph up through the third embodiment in this paragraph wherein the liquefied petroleum gas stream has less than 100 wppm sulfur. An embodiment of the invention is one, any or all of prior embodiments in this paragraph up through the third embodiment in this paragraph further comprising contacting the diolefin depleted, liquid cracked stream with an adsorbent to adsorb silicon from the diolefin depleted, liquid cracked stream to provide an adsorbed, liquid cracked stream; contacting the adsorbed, liquid cracked stream with a demetallization catalyst in the presence of a second hydrogen stream to provide a demetallized, liquid cracked stream; and debutanizing the demetallized, liquid cracked stream.

A fourth embodiment of the invention is an apparatus for selectively hydrogenating diolefins in a cracked stream comprising a cracking reactor for cracking a hydrocarbon feed stream at elevated temperature to provide a cracked stream; a fractionation column in downstream communication with the cracking reactor for fractionating the cracked stream to provide a liquid cracked stream; a stripping column in downstream communication with the fractionation column for stripping the liquid cracked stream to remove dry gas from the liquid cracked stream and provide a stripped, liquid cracked stream; a debutanizer column in downstream communication with the stripping column for debutanizing the stripped, liquid cracked stream to provide a naphtha stream and a liquefied petroleum gas stream; and a diolefin hydrogenation reactor in upstream communication with the debutanizer column for selectively hydrogenating diolefins to provide a diolefin depleted, liquid cracked stream. An embodiment of the invention is one, any or all of prior embodiments in this paragraph up through the fourth embodiment in this paragraph further comprising a bed of silicon trapping adsorbent in downstream communication with the stripping column. An embodiment of the invention is one, any or all of prior embodiments in this paragraph up through the fourth embodiment in this paragraph further comprising a bed of demetallization catalyst in downstream communication with the stripping column. An embodiment of the invention is one, any or all of prior embodiments in this paragraph up through the fourth embodiment in this paragraph further comprising an decontaminant column comprising a bed of demetallization catalyst and a bed of silicon trapping adsorbent in downstream communication with the stripping column. An embodiment of the invention is one, any or all of prior embodiments in this paragraph up through the fourth embodiment in this paragraph further comprising the debutanizer column in downstream communication with the bed of silicon trapping adsorbent and bed of demetallization catalyst. An embodiment of the invention is one, any or all of prior embodiments in this paragraph up through the fourth embodiment in this paragraph further comprising a primary absorber column in downstream communication with the fractionation column and the stripping column is in downstream communication with the primary absorber column. An embodiment of the invention is one, any or all of prior embodiments in this paragraph up through the fourth embodiment in this paragraph wherein the diolefin hydrogenation reactor is in downstream communication with the fractionation column.

A fifth embodiment of the invention is an apparatus for selectively hydrogenating diolefins in a cracked stream comprising a cracking reactor for cracking a hydrocarbon feed stream at elevated temperature to provide a cracked stream; a fractionation column in downstream communication with the cracking reactor for fractionating the cracked stream to provide a liquid cracked stream; a stripping column in downstream communication with the fractionation column for stripping the liquid cracked stream to remove dry gas from the liquid cracked stream and provide a stripped, liquid cracked stream; a debutanizer column in downstream communication with the stripping column for debutanizing the stripped, liquid cracked stream to provide a naphtha stream and a liquefied petroleum gas stream; and a diolefin hydrogenation reactor in upstream communication with the debutanizer column and in downstream communication with the stripping column for selectively hydrogenating diolefins to provide a diolefin depleted, liquid cracked stream. An embodiment of the invention is one, any or all of prior embodiments in this paragraph up through the fifth embodiment in this paragraph further comprising a bed of silicon trapping adsorbent in downstream communication with the stripping column. An embodiment of the invention is one, any or all of prior embodiments in this paragraph up through the fifth embodiment in this paragraph further comprising a bed of demetallization catalyst in downstream communication with the stripping column. An embodiment of the invention is one, any or all of prior embodiments in this paragraph up through the fifth embodiment in this paragraph further comprising an decontaminant column comprising a bed of demetallization catalyst and a bed of silicon trapping adsorbent in downstream communication with the stripping column. An embodiment of the invention is one, any or all of prior embodiments in this paragraph up through the fifth embodiment in this paragraph further comprising the debutanizer column in downstream communication with the bed of silicon trapping adsorbent and bed of demetallization catalyst. An embodiment of the invention is one, any or all of prior embodiments in this paragraph up through the fifth embodiment in this paragraph further comprising a primary absorber column in downstream communication with the fractionation column and the stripping column is in downstream communication with the primary absorber column. An embodiment of the invention is one, any or all of prior embodiments in this paragraph up through the fifth embodiment in this paragraph wherein a receiver is in downstream communication with an overhead line of the debutanizer column, An embodiment of the invention is one, any or all of prior embodiments in this paragraph up through the fifth embodiment in this paragraph wherein the diolefin hydrogenation reactor is in downstream communication with fractionation column.

A sixth embodiment of the invention is an apparatus for selectively hydrogenating diolefins in a cracked stream comprising a cracking reactor for cracking a hydrocarbon feed stream at elevated temperature to provide a cracked stream; a fractionation column in downstream communication with the cracking reactor for fractionating the cracked stream to provide a liquid cracked stream; a stripping column in downstream communication with the fractionation column for stripping the liquid cracked stream to remove dry gas from the liquid cracked stream and provide a stripped, liquid cracked stream; a debutanizer column in downstream communication with the stripping column for debutanizing the stripped, liquid cracked stream to provide a naphtha stream and a liquefied petroleum gas stream; and a diolefin hydrogenation reactor in upstream communication with the debutanizer column and in downstream communication with the fractionation column for selectively hydrogenating diolefins to provide a diolefin depleted, liquid cracked stream. An embodiment of the invention is one, any or all of prior embodiments in this paragraph up through the sixth embodiment in this paragraph further comprising a bed of silicon trapping adsorbent in downstream communication with the stripping column. An embodiment of the invention is one, any or all of prior embodiments in this paragraph up through the sixth embodiment in this paragraph further comprising a bed of demetallization catalyst in downstream communication with the stripping column. An embodiment of the invention is one, any or all of prior embodiments in this paragraph up through the sixth embodiment in this paragraph further comprising an decontaminant column comprising a bed of demetallization catalyst and a bed of silicon trapping adsorbent in downstream communication with the stripping column. An embodiment of the invention is one, any or all of prior embodiments in this paragraph up through the sixth embodiment in this paragraph further comprising the debutanizer column in downstream communication with the bed of silicon trapping adsorbent and bed of demetallization catalyst.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

The invention claimed is:

1. A process for selectively hydrogenating diolefins in a cracked stream comprising:
cracking a hydrocarbon feed stream at elevated temperature to provide a cracked stream; fractionating said cracked stream to provide a liquid cracked stream;
stripping said liquid cracked stream to remove dry gas from the liquid cracked stream and provide a stripped liquid cracked stream;
debutanizing said stripped liquid cracked stream to provide a naphtha stream and a liquefied petroleum gas stream;
selectively hydrogenating diolefins in said stripped liquid cracked stream prior to the debutanizing step to provide a diolefin depleted, liquid cracked stream in the presence of a first hydrogen stream; and
contacting said diolefin depleted, liquid cracked stream with an adsorbent to adsorb silicon from said diolefin depleted, liquid cracked stream.

2. The process of claim 1 further comprising contacting said diolefin depleted, liquid cracked stream with a demetallization catalyst in the presence of a second hydrogen stream to demetallize said diolefin depleted, liquid cracked stream.

3. The process of claim 1 further comprising adding the second hydrogen stream to said diolefin depleted, liquid cracked stream, contacting said diolefin depleted, liquid cracked stream with an adsorbent to adsorb silicon from said diolefin depleted, liquid cracked stream; and contacting said diolefin depleted, liquid cracked stream with a demetallization catalyst in the presence of the second hydrogen stream to demetallize said diolefin depleted, liquid cracked stream.

4. The process of claim 3 wherein fractionating said cracked stream further comprises contacting said cracked stream with a gaseous cracked stream to absorb heavier components in said gaseous cracked stream to provide said liquid cracked stream and an off-gas stream; and taking said first hydrogen stream and said second hydrogen stream from said off-gas stream.

5. The process of claim 1 wherein fractionating said cracked stream further comprises contacting said cracked stream with a gaseous cracked stream to absorb heavier components in said gaseous cracked stream to provide said liquid cracked stream and an off-gas stream; taking said first hydrogen stream from said off-gas stream.

6. The process of claim 1 further comprising selectively hydrogenating diolefins in said stripped cracked stream, recovering a recycle hydrogen gas stream from an overhead of said debutanizer column and taking said first hydrogen stream from said recycle hydrogen stream.

7. The process of claim 1 further comprising contacting said hydrocarbon feed stream with a cracking catalyst to crack the hydrocarbons to produce said cracked stream deposit coke on said cracking catalyst to provide coked cracking catalyst; separating said coked cracking catalyst from said cracked stream; adding oxygen to said coked cracking catalyst; combusting coke on said coked cracking catalyst with oxygen to regenerate said cracking catalyst.

8. The process of claim 1 wherein said liquefied petroleum gas stream has less than 100 wppm sulfur.

9. A process for selectively hydrogenating diolefins in a cracked stream comprising:
cracking a hydrocarbon feed stream at elevated temperature to provide a cracked stream; fractionating said cracked stream to provide a liquid cracked stream;
stripping said liquid cracked stream to remove dry gas from the liquid cracked stream and provide a stripped liquid cracked stream;

selectively hydrogenating diolefins in said stripped liquid cracked stream to provide a diolefin depleted, liquid cracked stream in the presence of a first hydrogen stream;

debutanizing said diolefin depleted, liquid cracked stream to provide a naphtha stream and a liquefied petroleum gas stream; and contacting said diolefin depleted, liquid cracked stream with a demetallization catalyst in the presence of a second hydrogen stream to demetallize said diolefin depleted, liquid cracked stream.

10. The process of claim 9 further comprising adding the second hydrogen stream to said diolefin depleted, liquid cracked stream, and contacting said diolefin depleted, liquid cracked stream with an adsorbent to adsorb silicon from said diolefin depleted, liquid cracked stream.

11. The process of claim 10 further comprising recovering a recycle hydrogen gas stream from an overhead of a debutanizer column for debutanizing said diolefin depleted, liquid cracked stream and taking said first hydrogen stream and said second hydrogen stream from said recycle hydrogen stream.

12. A process for selectively hydrogenating diolefins in a cracked stream comprising:

cracking a hydrocarbon feed stream at elevated temperature to provide a cracked stream; fractionating said cracked stream to provide a liquid cracked stream;

stripping said liquid cracked stream to remove dry gas from the liquid cracked stream and provide a stripped liquid cracked stream;

selectively hydrogenating diolefins in said liquid cracked stream to provide a diolefin depleted, liquid cracked stream in the presence of a first hydrogen stream;

debutanizing said diolefin depleted, liquid cracked stream in a debutanizer column to provide a naphtha stream and a liquefied petroleum gas stream;

recovering a recycle hydrogen gas stream from an overhead of said debutanizer column and taking said first hydrogen stream from said recycle hydrogen stream; and contacting said diolefin depleted, liquid cracked stream with an adsorbent to adsorb silicon from said diolefin depleted, liquid cracked stream.

13. The process of claim 12 further comprising contacting said diolefin depleted, liquid cracked stream with a demetallization catalyst in the presence of a second hydrogen stream to demetallize said diolefin depleted, liquid cracked stream.

14. The process of claim 12 further comprising adding a second hydrogen stream to said diolefin depleted, liquid cracked stream, contacting said diolefin depleted, liquid cracked stream with an adsorbent to adsorb silicon from said diolefin depleted, liquid cracked stream; and contacting said diolefin depleted, liquid cracked stream with a demetallization catalyst in the presence of a second hydrogen stream to demetallize said diolefin depleted, liquid cracked stream.

15. The process of claim 12 wherein fractionating said cracked stream further comprises contacting said cracked stream with a gaseous cracked stream to absorb heavier components in said gaseous cracked stream to provide said liquid cracked stream and an off-gas stream; and taking said first hydrogen stream from said off-gas stream.

16. The process of claim 12 further comprising contacting said hydrocarbon feed stream with a cracking catalyst to crack the hydrocarbons to produce said cracked stream and deposit coke on said cracking catalyst to provide coked cracking catalyst; separating said coked cracking catalyst from said cracked stream; adding oxygen to said coked cracking catalyst; combusting coke on said coked cracking catalyst with oxygen to regenerate said cracking catalyst.

17. The process of claim 12 wherein said liquefied petroleum gas stream has less than 100 wppm sulfur.

18. The process of claim 12 further comprising contacting said diolefin depleted, liquid cracked stream with an adsorbent to adsorb silicon from said diolefin depleted, liquid cracked stream to provide an adsorbed, liquid cracked stream; contacting said adsorbed, liquid cracked stream with a demetallization catalyst in the presence of a second hydrogen stream to provide a demetallized, liquid cracked stream; and debutanizing said demetallized, liquid cracked stream.

19. The process of claim 9 wherein fractionating said cracked stream further comprises contacting said cracked stream with a gaseous cracked stream to absorb heavier components in said gaseous cracked stream to provide said liquid cracked stream and an off-gas stream; and taking said first hydrogen stream from said off-gas stream.

20. The process of claim 9 wherein the step of selectively hydrogenating diolefins in said stripped cracked stream further comprising, recovering a recycle hydrogen gas stream from an overhead of said debutanizer column and taking said first hydrogen stream from said recycle hydrogen stream.

* * * * *